May 18, 1965  A. BELL  3,183,969
HEAT EXCHANGERS
Filed Feb. 28, 1962  2 Sheets-Sheet 1
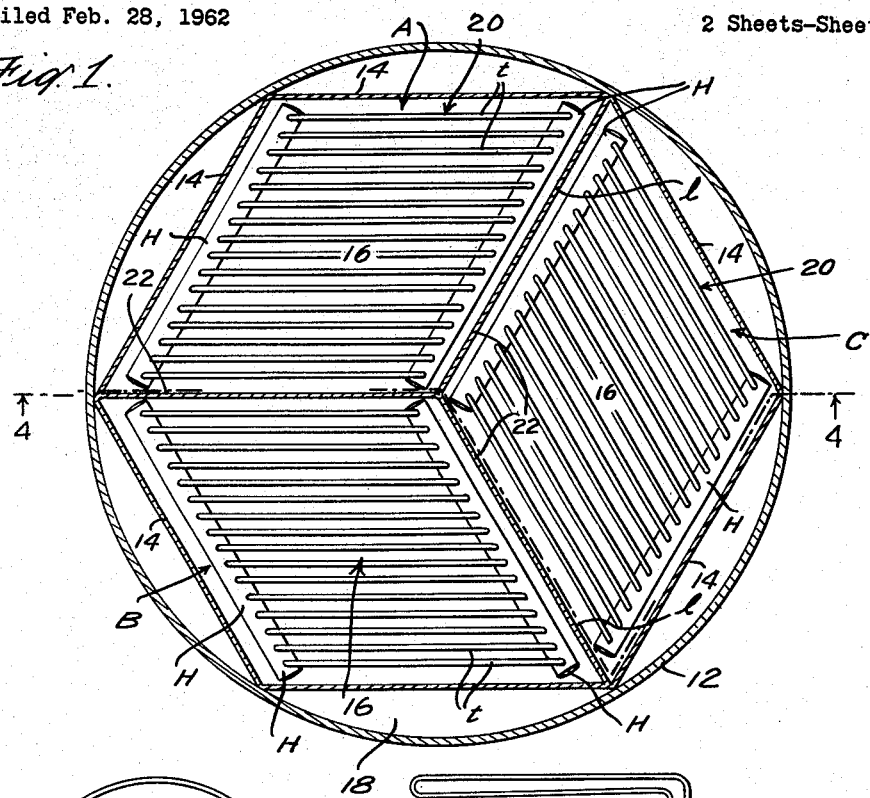
*Fig. 1.*
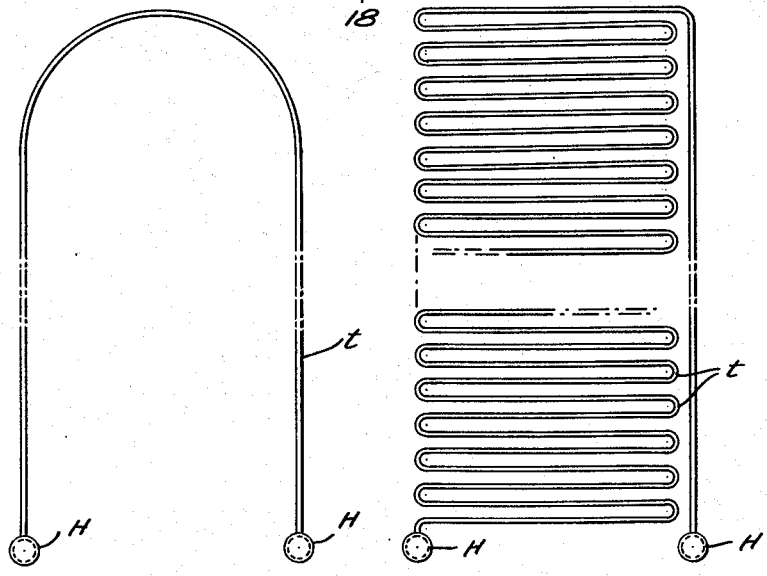
*Fig. 2.*  *Fig. 3.*
INVENTOR
ALAN BELL
BY Richard H. Thomas
ATTORNEY

INVENTOR
ALAN BELL

BY Richard H. Thomas
ATTORNEY 3,183,969
HEAT EXCHANGERS
Alan Bell, Cookham, Berks, England, assignor to Foster Wheeler Corporation, New York, N.Y., a corporation of New York
Filed Feb. 28, 1962, Ser. No. 176,456
4 Claims. (Cl. 165—160)

This invention relates to heat exchangers and is concerned with the provision of a large heat exchange surface for a given heat exchanger volume. This is a matter of considerable importance in many industrial fields, and, particularly, in nuclear power plants, where the amount of heat to be dissipated is very large.

The invention is also concerned with the problem of relieving thermal stresses between adjacent members of a heat exchanger which are at different temperatures.

The heat exchanger in accordance with the invention is of the tube and shell type having a cylindrical shell containing three assemblies or bundles of tubes, which tubes may be straight, U-tubes or flat coils. The tubes in each assembly are disposed close to each other in parallel planes so that the tube bundles form parallelepipeds, and the assemblies are juxtaposed so that the cross-section of the three assemblies is a hexagon circumscribed by the cylindrical shell.

The three tube bundles can be connected in series with each other or in parallel. The shell can be unobstructed internally except by the tube bundles or it can be baffled or otherwise partitioned to provide compartments housing the bundles and defining a long path for the heat exchange medium passing through the shell.

The invention will become apparent upon further consideration of the specification and on consideration of the accompanying drawings in which:

FIGURE 1 is a schematic plan section view of a tube and shell heat exchanger in accordance with the invention;

FIGURES 2 and 3 illustrate schematically tube configurations for the invention;

Figure 4:
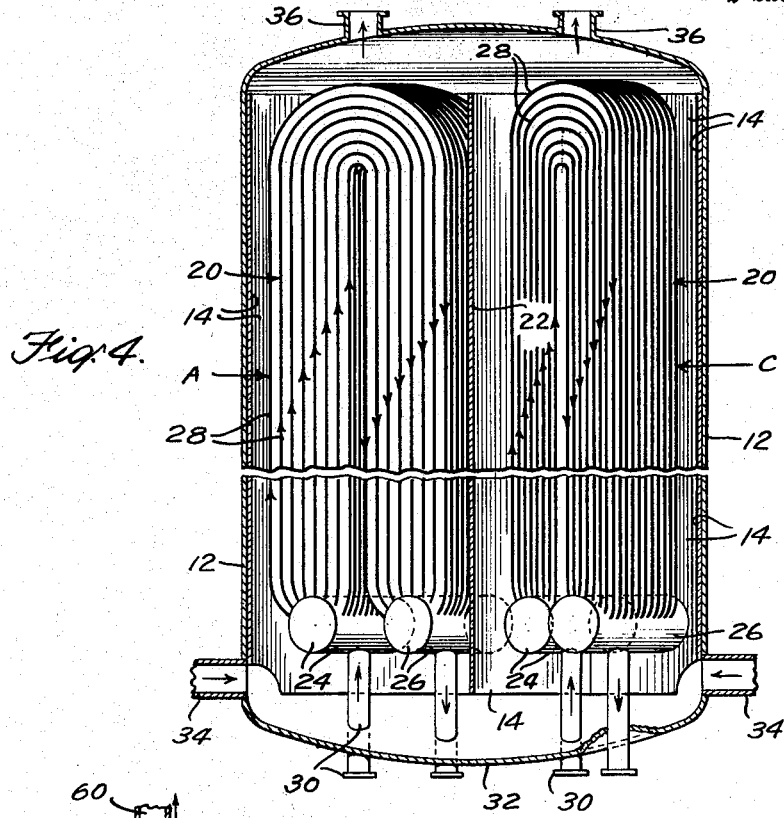
FIGURE 4 is a diagrammatic section elevation view taken along line 4—4 of FIG. 1, illustrating a heat exchanger, in accordance with the invention, having parallel flow paths therein.

Before describing specific structural aspects of the invention, theoretical or abstract features will be described. FIG. 1 if the drawings shows a circle circumscribing a hexagon, the latter being subdivided by three radial lines $l$ and into three identical parallelograms A, B, C. The area of the hexagon is about 83% of the area of the circle. If each parallelogram is considered to be the cross-section of a duct, which may be either notional or physical, in a cylindrical heat exchanger shell (of which the circle is a cross-sectional view), the solution of the problem of utilizing the space in the shell to the greatest advantage is to devise an arrangement of tubes which utilizes the greatest amount of the space in each one of the three identical ducts or parallelograms.

A number of such arrangements are available. One very favorable arrangement is to provide a pair of headers set in the same plane parallel to and close to two opposite sides of each parallelogram, as indicated at H in FIG. 1, and to interconnect the headers in each pair by U-tubes $t$ lying in planes parallel to the other two sides of the parallelogram. This produces three bundles of tubes which are identical parallelepipeds each substantially filling one of the ducts. It is to be noted that it is immaterial to which pair of opposite sides the headers are parallel.

The U-tubes $t$ can be of simple hairpin shape as shown in FIG. 2 or can be partly in the uform of flat coils as shown in FIG. 3.

The invention in one aspect thus resides in arranging a plurality of heat exchanger tubes in a tube bundle in the shape of a parallelepiped, and positioning three identical such tube bundles within a circular shell to form a hexagonal shaped configuration. The tube bundles may or may not be divided by separating baffles.

With respect to specific structure, FIG. 1 illustrates diagrammatically a circular heat exchanger shell 12 in which is disposed, in its longitudinal direction, a hexagonally shaped baffle 14 defining an inner heating chamber 16 and an area 18 which may be an outer flow passageway. Tube bundles 20, arranged as parallelepipeds as described above, are disposed within the heating chamber in juxtaposed relationship and may be separated by inner radial baffles 22 defining parallel ducts extending through the exchanger, the ducts each having a cross-section in the shape of a parallelogram. With the baffles 22 the flow through the exchanger can be a parallel or series flow, as will be described.

If the exchanger is of the water tube type with a high temperature fluid being circulated around the tubes, it may be desirable to admit the hot fluid to the heating chamber 16 and to pass the fluid after cooling outwardly through the outer passageway 18. This maintains the shell 12 in a relatively cooled state, and provides, as will be shown, a means by which thermal stresses may be prevented.

FIG. 4 illustrates the tube bundles 20 in more detail, arranged in a heat exchanger shell 12 in overlapping relationship. The FIG. 4 view actually is taken along a line such as line 4—4 of FIG. 1 showing only two tube bundles or parallelepiped sections, such as bundles A and C of FIG. 1. Each bundle comprises an inlet header 24 and outlet header 26 at the same end of the shell and joined by a plurality of hairpin shaped U-tubes 28 in a conventional manner. Each header has a connection 30 passing through an end wall 32, of the shell so that the heat exchange fluid flowing in the tubes flows through the exchanger in three parallel paths entering and leaving the shell at the same end. The other heat exchange fluid passes through the shell from inlets 34 in communication with the heating chamber 16 and adjacent the connections 30 to outlets 36 positioned at the opposite end of the exchanger for a single pass. Again, however, if thermal stresses are a problem, it may be desirable to arrange the hot fluid inlets and outlets so that the high temperature incoming fluid enters the exchange heating chamber 16 and the lower temperature outgoing fluid passes out through the outer passageway 18 (FIG. 1).

Figure 5:
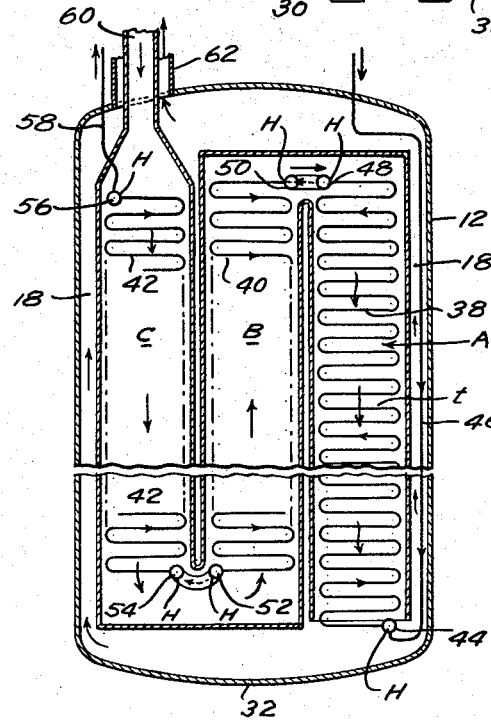
FIGURE 5 is a diagrammatic section elevation view of an embodiment in accordance with the invention of a heat exchanger having series flow.

FIG. 5 shows another arrangement of the tube bundles which are, in this instance, connected in series. Here, the bundles are shown side-by-side instead of overlapping, for ease of illustration.

The shell 12 is internally subdivided into the three ducts, A, B, and C, in the manner described with reference to FIG. 1, the ducts having the same cross-sectional configuration. The ducts, housing tube bundles 38, 40, and 42, are connected in series, the ducts A and B communicating at the upper end and the ducts B and C communicating at the lower end. Each tube bundle comprises inlet and outlet headers H at opposite ends of the shell, joined by tubes $t$ in the form of flat coils.

The tube arrangement is as follows. The inlet header 44 of the bundle 38 has an inlet connection 46 passing through the upper end of the shell; the outlet header 48 of the bundle 38 is connected at the top end of the ducts A and B to the inlet header 50 of the bundle 40; the outlet header 52 of the bundle 40 is connected at the bottom end of the ducts B and C to the inlet header 54 of the bundle 42; and the outlet header 56 of the bundle 42 has an outlet connection 58 passing through the upper end of the shell.

The other heat exchange fluid, for instance, the heating fluid, which for the purpose of this specification may be deemed the primary fluid, enters the exchanger through conduit 60 passing through the ducts C, B, and A in that order and exiting from the duct A at the bottom of the chamber to pass through outer passageway 18 to outlet 62.

The two fluids thus flow counter-current to each other at all times. But further the shell is protected from the high temperature of the incoming heating fluid and resulting thermal stresses by the flow of the cooled primary fluid adjacent the shell. As an aspect of the invention, the incoming fluid duct 60 is encompassed by and coaxial with the outlet duct 62 to avoid stress in a connection between the duct 60 and the shell 12.

In both arrangements, FIG. 4 and FIG. 5, the space within the shell is, for all intents and purposes, completely filled with tubes so that the capacity of the heat exchangers is very large in comparison with their volume.

Although the invention has been described with respect to specific embodiments, many modifications will be apparent to those skilled in the art. Accordingly, the scope of the invention should be limited only as defined in the following claims:

What is claimed is:

1. A tube and shell heat exchanger comprising a cylindrical shell, a plurality of tube assemblies disposed in said shell, each of said assemblies comprising a plurality of heat exchanger tubes positioned in parallel planes to form a parallelepiped configuration for said assembly, said assemblies being juxtaposed so that the cross-sections thereof form a hexagonal configuration and being disposed within said cylindrical shell so that the hexagonal configuration is circumscribed by the circular cross-section of said shell, said shell being subdivided by baffles extending longitudinally within the shell and defining compartments each containing one of said assemblies, said baffles defining in cross-section a parallelogram configuration for each assembly and an outer annular hexagonal configuration encompassing the plurality of assemblies, and a flow passage between said outer hexagonal baffle and said cylindrical shell and further comprising a means for passing one fluid through said tube assemblies and means for passing another fluid through said compartments.

2. A tube and shell heat exchanger according to claim 1 wherein said means for passing one fluid through said tube assemblies includes means for connecting said tube assemblies in series and wherein said means for passing another fluid through said compartments includes means for connecting said compartments in series.

3. A tube and shell heat exchanger according to claim 2 wherein said compartments and tube assemblies are arranged for counter-current flow of the heat exchanging fluids.

4. A tube and shell heat exchanger according to claim 2 and further including a plurality of tube inlet and outlet headers disposed within the shell wherein the tubes in each assembly are connected between inlet and outlet headers for that assembly, said headers being positioned in planes parallel to one of the sides of said parallelepiped configuration.

References Cited by the Examiner
UNITED STATES PATENTS

| | | | |
|---|---|---|---|
| 1,794,336 | 2/31 | Jacocks | 165—158 |
| 1,808,619 | 6/31 | Uhde | 165—160 X |
| 1,818,762 | 8/31 | Setchkin | 165—162 X |
| 1,896,213 | 2/33 | Armacost | 165—161 X |
| 2,612,350 | 9/52 | Stadler | 165—159 X |

CHARLES SUKALO, *Primary Examiner.*